United States Patent
Lorrigan (10) Patent No.: US 9,415,786 B1
(45) Date of Patent: Aug. 16, 2016

(54) EXPANDABLE COOLER CART

(71) Applicant: Daniel P. Lorrigan, Hartford, WI (US)

(72) Inventor: Daniel P. Lorrigan, Hartford, WI (US)

( * ) Notice: Subject to any disclaimer, the term of this patent is extended or adjusted under 35 U.S.C. 154(b) by 0 days.

(21) Appl. No.: 14/863,694

(22) Filed: Sep. 24, 2015

Related U.S. Application Data (63) Continuation-in-part of application No. 14/488,570, filed on Sep. 17, 2014, now abandoned.

(60) Provisional application No. 61/953,950, filed on Mar. 17, 2014.

(51) Int. Cl.
*B62B 3/02* (2006.01)
*B62B 1/26* (2006.01)
*B62B 1/12* (2006.01)

(52) U.S. Cl.
CPC .. *B62B 1/26* (2013.01); *B62B 1/125* (2013.01)

(58) Field of Classification Search
CPC ...... B62B 2204/06; B62B 1/20; A45C 11/20; A45C 5/14; A45C 5/146
See application file for complete search history.

(56) References Cited

U.S. PATENT DOCUMENTS

| | | | | |
|---|---|---|---|---|
| 362,868 A | * | 5/1887 | Roberts | B62B 1/10 190/18 A |
| 1,942,562 A | * | 1/1934 | Meyers | B62B 1/264 280/47.19 |
| D145,505 S | * | 9/1946 | Beidelman | B62B 1/264 280/47.24 |
| 2,472,491 A | * | 6/1949 | Quinton | A45C 5/146 280/37 |
| 2,510,754 A | * | 6/1950 | Norlin | A45C 5/146 190/18 A |
| 2,855,210 A | * | 10/1958 | Joyce | B62B 1/18 248/907 |
| 3,341,219 A | * | 9/1967 | Marini | B62B 1/264 211/85.19 |
| 3,711,110 A | * | 1/1973 | Logerquist | A45C 5/14 280/37 |
| 3,762,738 A | * | 10/1973 | Christina | B62B 1/18 248/907 |
| 4,017,092 A | * | 4/1977 | Boomer | B62B 1/20 248/98 |
| D252,265 S | * | 7/1979 | Gardner | B62B 1/264 D34/25 |
| 4,796,909 A | * | 1/1989 | Kirkendall | B62B 3/02 180/906 |
| 4,846,493 A | * | 7/1989 | Mason | A45C 5/146 190/18 A |
| 4,873,841 A | * | 10/1989 | Bradshaw | A45C 5/14 280/47.17 |
| 5,016,893 A | * | 5/1991 | Hart, Jr. | B62B 3/10 211/195 |
| 5,040,808 A | * | 8/1991 | McIntyre | B62B 1/18 248/129 |
| D322,198 S | * | 12/1991 | Dringenburg | B62B 1/18 D34/19 |

(Continued)

*Primary Examiner* — Brodie Follman
(74) *Attorney, Agent, or Firm* — Donald J. Ersler (57) ABSTRACT

A cooler cart preferably includes a carrier member, a handle, an axle and a pair of wheels. The carrier member preferably includes a bottom frame, a top frame, a first axle frame member, a second axle frame member and a plurality of vertical frame members. An expandable cooler cart preferably includes a left rear support, a right rear support, a left middle telescoping section, a right middle telescoping section, a left front section, a right front section, a plurality of widthwise telescoping tubes and a plurality of pipe clamps. In use, the plurality of pipe clamps are loosened and the plurality of telescoping connections are slid to accommodate the outer perimeter of a cooler. The plurality of pipe clamps are then tightened.

20 Claims, 10 Drawing Sheets

(56) References Cited

U.S. PATENT DOCUMENTS

| | | | | |
|---|---|---|---|---|
| 5,080,387 A * | 1/1992 | Ryals | B62B 1/20 | 280/47.24 |
| 5,220,740 A * | 6/1993 | Brault | F16M 11/42 | 248/910 |
| 5,232,232 A * | 8/1993 | Kishi | B60B 33/06 | 280/43.1 |
| 5,249,438 A * | 10/1993 | Rhaney | A45C 5/14 | 16/113.1 |
| 5,249,823 A * | 10/1993 | McCoy | B62B 3/02 | 280/144 |
| 5,269,157 A * | 12/1993 | Ciminelli | A45B 11/00 | 280/47.18 |
| 5,299,817 A * | 4/1994 | Chang | B62B 5/0083 | 280/35 |
| 5,313,817 A * | 5/1994 | Meinders | A45C 5/146 | 190/18 A |
| 5,465,996 A * | 11/1995 | Wisz | A45C 13/385 | 280/35 |
| 5,476,282 A * | 12/1995 | Dahl | B62B 1/002 | 280/47.18 |
| 5,599,031 A * | 2/1997 | Hodges | B62B 5/0083 | 280/35 |
| D384,464 S * | 9/1997 | Tonzillo | B62B 1/18 | D34/12 |
| 5,806,878 A * | 9/1998 | Mroczka | B60B 3/085 | 280/47.31 |
| 5,845,915 A * | 12/1998 | Wilson | B62B 1/14 | 280/47.19 |
| 5,921,635 A * | 7/1999 | Deliman | A45C 5/14 | 190/18 A |
| 6,036,219 A * | 3/2000 | Oefelein | B62B 3/02 | 280/35 |
| 6,092,817 A * | 7/2000 | Kilmer | B62B 1/125 | 280/47.26 |
| 6,095,533 A * | 8/2000 | Balolia | B60T 1/14 | 188/19 |
| 6,109,644 A * | 8/2000 | Cox | B62B 1/20 | 280/47.24 |
| 6,276,698 B1 * | 8/2001 | Calandra | B62B 15/00 | 280/18 |
| 6,328,179 B1 * | 12/2001 | Conrado | A45C 5/14 | 108/14 |
| 6,471,237 B1 * | 10/2002 | Bedsole | B62B 1/12 | 280/47.26 |
| 6,550,791 B2 * | 4/2003 | Ramsey | A01K 97/22 | 280/47.19 |
| 6,585,304 B1 * | 7/2003 | Boozer | B62B 1/208 | 220/6 |
| 6,783,147 B1 * | 8/2004 | Green, Sr. | B62B 1/20 | 280/47.26 |
| 7,210,545 B1 * | 5/2007 | Waid | B60K 7/0007 | 180/19.1 |
| 7,322,586 B1 * | 1/2008 | Zettel | B62B 1/18 | 280/47.24 |
| D604,473 S * | 11/2009 | Gibson | B62B 1/18 | D34/16 |
| 7,866,679 B1 * | 1/2011 | Leon | B62B 1/264 | 280/47.131 |
| 8,256,242 B1 * | 9/2012 | Evans | A45C 13/262 | 62/457.7 |
| 2002/0070517 A1 * | 6/2002 | Ramsey | A01K 97/22 | 280/47.19 |
| 2003/0168371 A1 * | 9/2003 | Weimer | A45C 11/20 | 206/457 |
| 2004/0017055 A1 * | 1/2004 | Panasewicz | B62B 1/006 | 280/33.998 |
| 2008/0001373 A1 * | 1/2008 | Vaughn | A45C 5/146 | 280/47.26 |
| 2011/0197625 A1 * | 8/2011 | Urban | B62B 5/067 | 62/457.1 |
| 2011/0226003 A1 * | 9/2011 | Chaney | A45C 5/065 | 62/457.7 |
| 2012/0273505 A1 * | 11/2012 | Bose | A45C 5/14 | 220/592.16 |

* cited by examiner

EXPANDABLE COOLER CART

CROSS-REFERENCES TO RELATED APPLICATIONS

This is a continuation-in-part application, which takes priority from non-provisional application Ser. No. 14/488,570, filed on Sep. 17, 2014, which claims the benefit of provisional application No. 61/953,950 filed on Mar. 17, 2014.

BACKGROUND OF THE INVENTION

1. Field of the Invention

The present invention relates generally to carts and more specifically to an expandable cooler cart, which allows different sizes of high-end coolers to be easily transported.

2. Discussion of the Prior Art

Patent no. D145505 to Beidelman discloses a hand truck. However, it appears that the prior art does not teach or suggest an expandable cooler cart for transporting fully filled high end coolers from brands, such as Yeti, Evakool, Cabelas Alaskan Guide, Igloo, Sandusky, Grizzly, K2 Coolers, Engel, Canyon and Icey-Tek.

Accordingly, there is a clearly felt need in the art for an expandable cooler cart, which allows different sizes of fully filled high-end coolers to be easily transported.

SUMMARY OF THE INVENTION

The present invention provides a cooler cart and an expandable cooler cart, which allow different sizes of high-end coolers to be easily transported. A cooler cart preferably includes a carrier member, a handle, an axle and a pair of wheels. The carrier member preferably includes a bottom frame, a top frame, a first axle frame member, a second axle frame member and a plurality of vertical frame members. The bottom frame preferably includes a U-shaped bottom frame member and a plurality of bottom horizontal frame members. Each end of the plurality of bottom horizontal frame members are attached inside the U-shaped perimeter of the bottom frame member. The top frame preferably includes a U-shaped top frame member and a top horizontal frame member. Each end of the top horizontal frame member is attached adjacent an open end of the U-shaped top frame member.

One end of the plurality of vertical frame members are attached to a top of the U-shaped bottom frame member and the other end of plurality of vertical frame members are attached to a bottom of the U-shaped top frame member. The handle preferably includes a U-shape. An open end of the handle is pivotally engaged with a closed end of the U-shaped top frame member. The first and second axle frame members each include an angled member and a vertical member. One end of the angled member is attached to one end of the vertical member.

The other end of the first angled member is attached to a first side of an open end of the U-shaped bottom frame member and the other end of the first vertical member is attached to a first side of an open end of the U-shaped top frame member. The other end of the second angled member is attached to a second side of an open end of the U-shaped bottom frame member and the other end of the second vertical member is attached to a second side of an open end of the U-shaped top frame member. A hole is formed through the angled members of the first and second axle frame members to receive the axle. A single wheel is rotatably retained on each end of the axle. The axle is preferably positioned in the first and second axle frame members, such that both wheels do not contact a support surface, when a bottom of the carrier member is laid on the support surface.

In use, a high end cooler is dropped into an inner perimeter of the U-shaped top and bottom frames. The handle is pulled upward and the weight of the high end cooler is supported by the pair of wheels.

An expandable cooler cart preferably includes a left rear support, a right rear support, a left middle telescoping section, a right middle telescoping section, a left front section, a right front section, a plurality of widthwise telescoping tubes and a plurality of pipe clamps. The left rear support includes a rear support tube, a rear telescoping tube, two rear vertical tubes, a plurality of rear support telescoping tubes, a rest support and a wheel. The lower rear support tube and the upper rear tube include an L-shape having a lengthwise leg and a widthwise leg. One end of the two rear vertical tubes is attached to the lower rear support tube and the other end of the two rear vertical tubes are attached to the upper rear tube.

A plurality of rear support telescoping tubes extend inward from the rear support tube. The rest support is attached to the widthwise leg of the rear support tube and the rear telescoping tube. The wheel is pivotally engaged with the rest support. The right rear support is a mirror image of the left rear support. Four rear widthwise telescoping tubes are preferably slidably engaged with an inner perimeter of the plurality of rear support telescoping tubes extending from the left and right rear supports and an inner perimeter of the widthwise legs of the rear support tube and the rear telescoping tube. The telescoping tubes are secured in place with the plurality of pipe clamps.

Each middle telescoping section includes a middle support tube, a middle telescoping tube and at least one middle vertical support member. Each middle support tube includes a middle lengthwise member and a middle support telescoping member extending from an inside of the middle lengthwise member. The middle telescoping tube is spaced apart from the middle support tube with the at least one middle vertical support member. One end of the middle support tube and the middle lengthwise telescoping tube is slidably retained in the rear lengthwise leg of the rear support tube and the rear telescoping tube, respectively. Each end of a middle widthwise telescoping tube is slidably engaged with the middle support telescoping member of left and right middle support tubes. All the telescoping connections are secured with the pipe clamp.

Each front section includes a front support tube, front telescoping tube and the at least one front vertical support member. Each front support tube includes a front lengthwise member and a front widthwise telescoping member extending from an inside of the front lengthwise member. The front telescoping tube is spaced apart from the front support tube with at least one front vertical support member. The front support tube and the front telescoping tube include an L-shape having a front lengthwise leg and a front widthwise leg. The front lengthwise legs of the front support tube and the front lengthwise telescoping tube are slidably received by the middle support tube and the middle telescoping tube, respectively. Three widthwise telescoping tubes are slidably received by the front widthwise telescoping member and the front widthwise legs of the front support tube and the front lengthwise telescoping tube. All the telescoping connections are secured with the pipe clamp. A handle is pivotally retained on one of the front widthwise telescoping tubes.

In use, the plurality of pipe clamps are loosened and the plurality of telescoping connections are slid to accommodate the outer perimeter of a cooler. The plurality of pipe clamps are then tightened. The expandable cooler cart may be stood-up on end to allow the cooler to be drained.

Accordingly, it is an object of the present invention to provide a cooler cart, which allows a fully filled high end cooler to be easily transported.

Finally, it is another object of the present invention to provide an expandable cooler cart, which may adjusted to accommodate nearly any size cooler.

These and additional objects, advantages, features and benefits of the present invention will become apparent from the following specification.

DETAILED DESCRIPTION OF THE PREFERRED EMBODIMENTS

Figure 1:
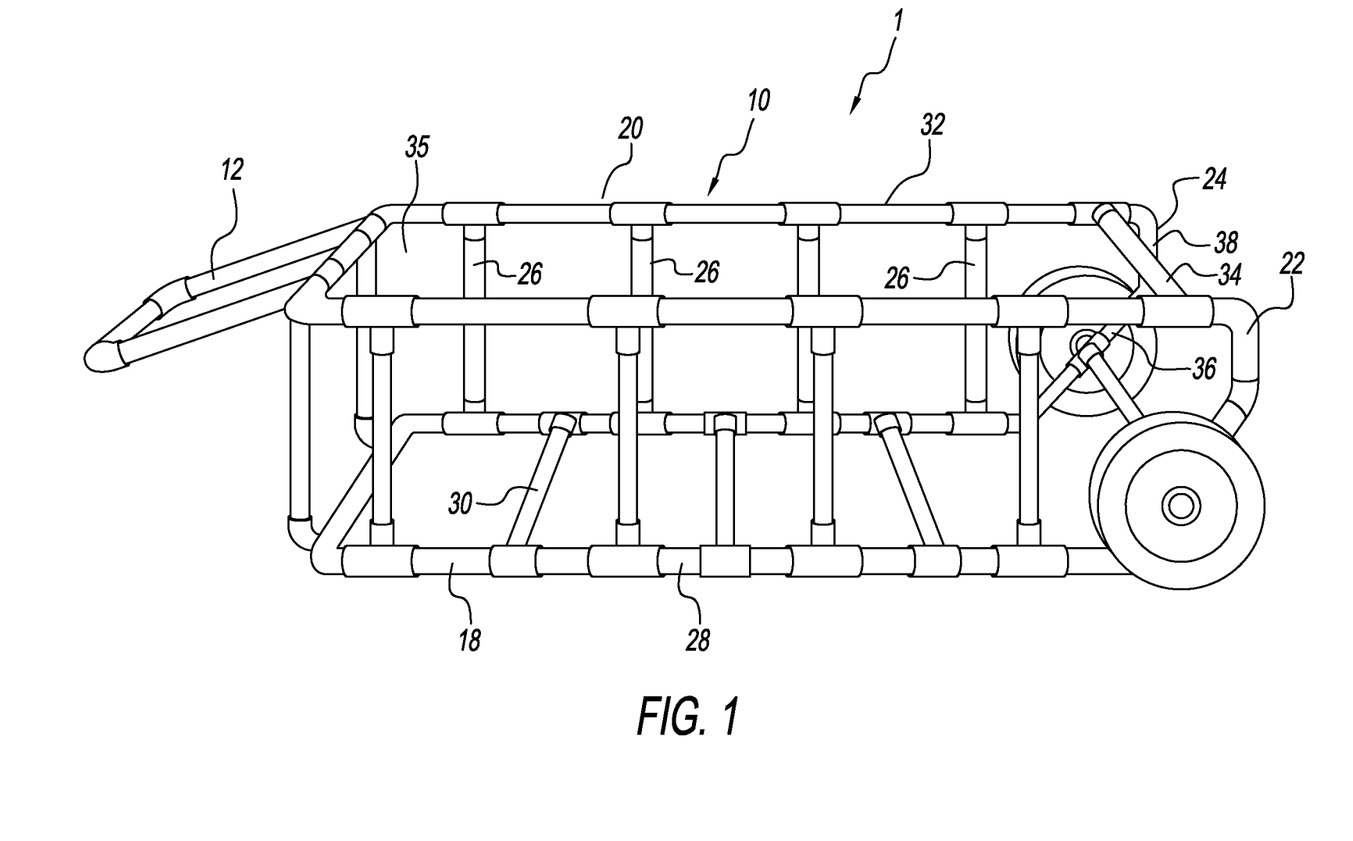
FIG. 1 is a side perspective view of a cooler cart in accordance with the present invention.
Figure 2:
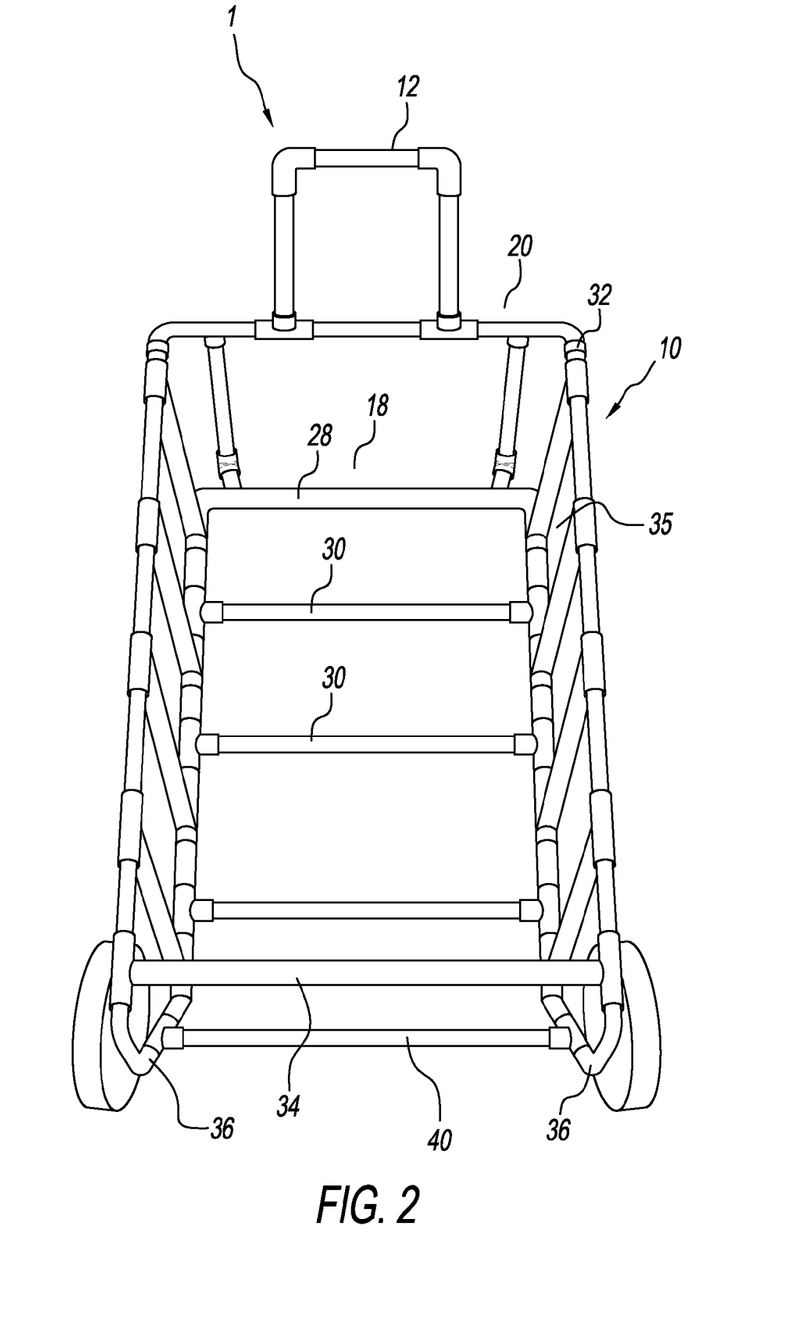
FIG. 2 is a top perspective view of a cooler cart in accordance with the present invention.
Figure 3:
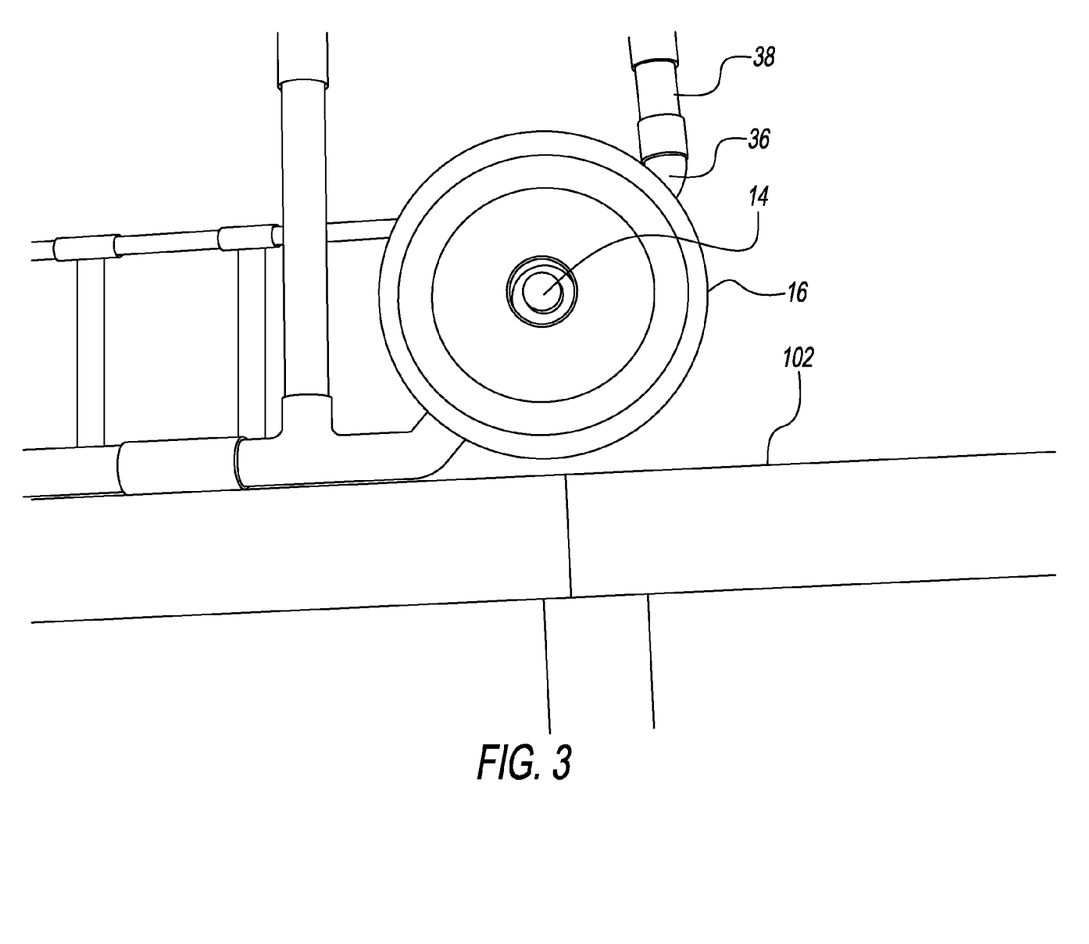
FIG. 3 is an enlarged side view of a first angled frame member of a cooler cart in accordance with the present invention.

With reference now to the drawings, and particularly to FIG. 1, there is shown a side perspective view of a cooler cart 1. With reference to FIGS. 2-3, the cooler cart preferably includes a carrier member 10, a handle 12, an axle 14 and a pair of wheels 16. The carrier member 10 preferably includes a bottom frame 18, a top frame 20, a first axle frame member 22, a second axle frame member 24 and a plurality of vertical frame members 26. The bottom frame 18 preferably includes a U-shaped bottom frame member 28 and a plurality of bottom horizontal frame members 30. Each end of the plurality of bottom horizontal frame members 30 are attached inside the U-shaped perimeter of the bottom frame member 28. The top frame 20 preferably includes a U-shaped top frame member 32 and a top horizontal frame member 34. Each end of the top horizontal frame member 34 is attached adjacent an open end of the U-shaped top frame member 32.

One end of the plurality of vertical frame members 26 are attached to a top of the U-shaped bottom frame member 28 and the other end of plurality of vertical frame members 26 are attached to a bottom of the U-shaped top frame member 32 to form a cooler cavity 35, which is sized to receive a high end cooler 100. The handle 12 preferably includes a U-shape. However, the carrier member 10 may have any other suitable construction, which includes the cooler cavity 35. An open end of the handle 12 is pivotally engaged with a closed end of the U-shaped top frame member 32. The first and second axle frame members 22, 24 each include an angled member 36 and a vertical member 38. One end of the angled member 36 is attached to one end of the vertical member 38.

The other end of the first angled member 36 is attached to a first side of an open end of the U-shaped bottom frame member 28 and the other end of the first vertical member 38 is attached to a first side of an open end of the U-shaped top frame member 32. The other end of the second angled member 36 is attached to a second side of an open end of the U-shaped bottom frame member 28 and the other end of the second vertical member 38 is attached to a second side of an open end of the U-shaped top frame member 32. An axle tube 40 is preferably attached between the first and second angled members 36. A hole is formed through the first and second angled members 36 of the first and second axle frame members 22, 24, concentric with an inner perimeter of the axle tube 40 to receive the axle 14. A single wheel 16 is rotatably retained on each end of the axle 14. The axle 14 is preferably positioned in the first and second axle frame members 36, such that both wheels 14 do not contact a support surface 102, when a bottom of the carrier member 10 is laid on the support surface 102.

Figure 4:
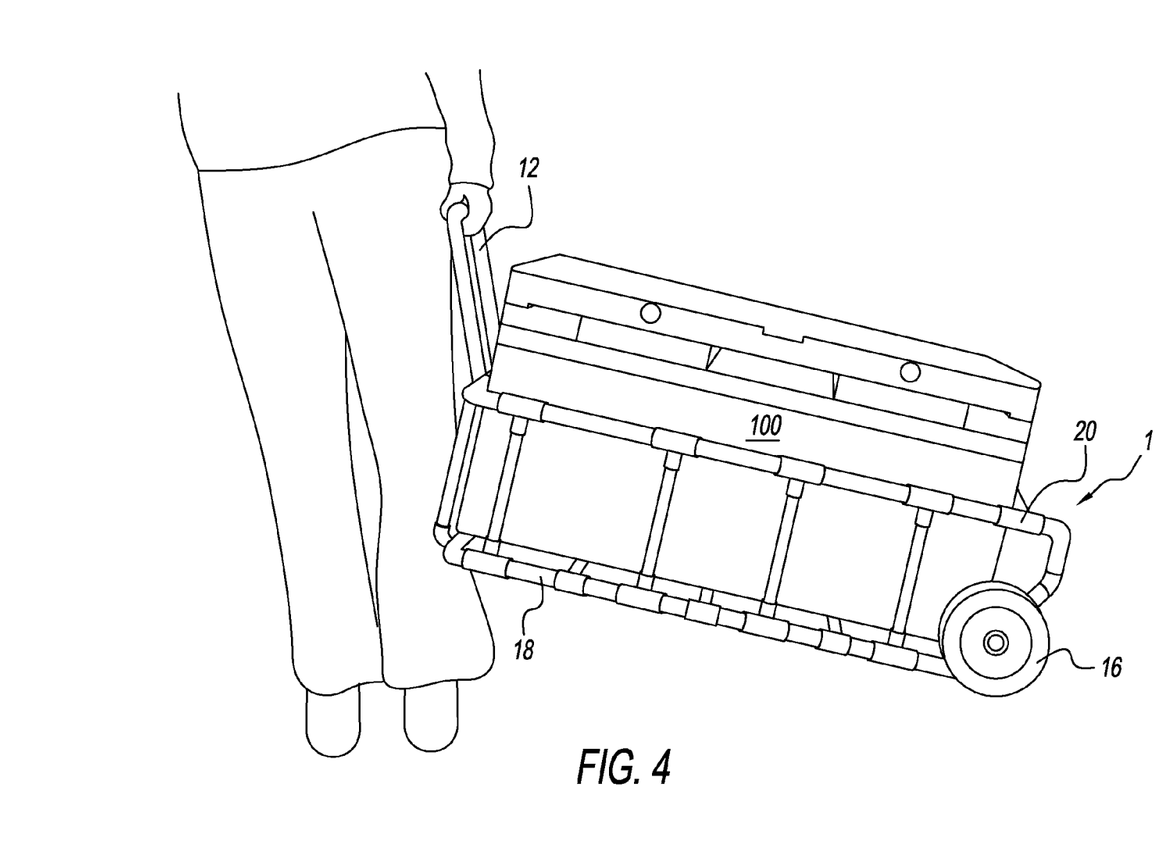
FIG. 4 is a side view of a cooler cart with a high end cooler retained therein in accordance with the present invention.

With reference to FIG. 4, the high end cooler 100 is dropped into an inner perimeter of the U-shaped top and bottom frames 18, 20. The handle 12 is pulled upward and the weight of the high end cooler 100 is supported by the pair of wheels 16.

Figure 5:
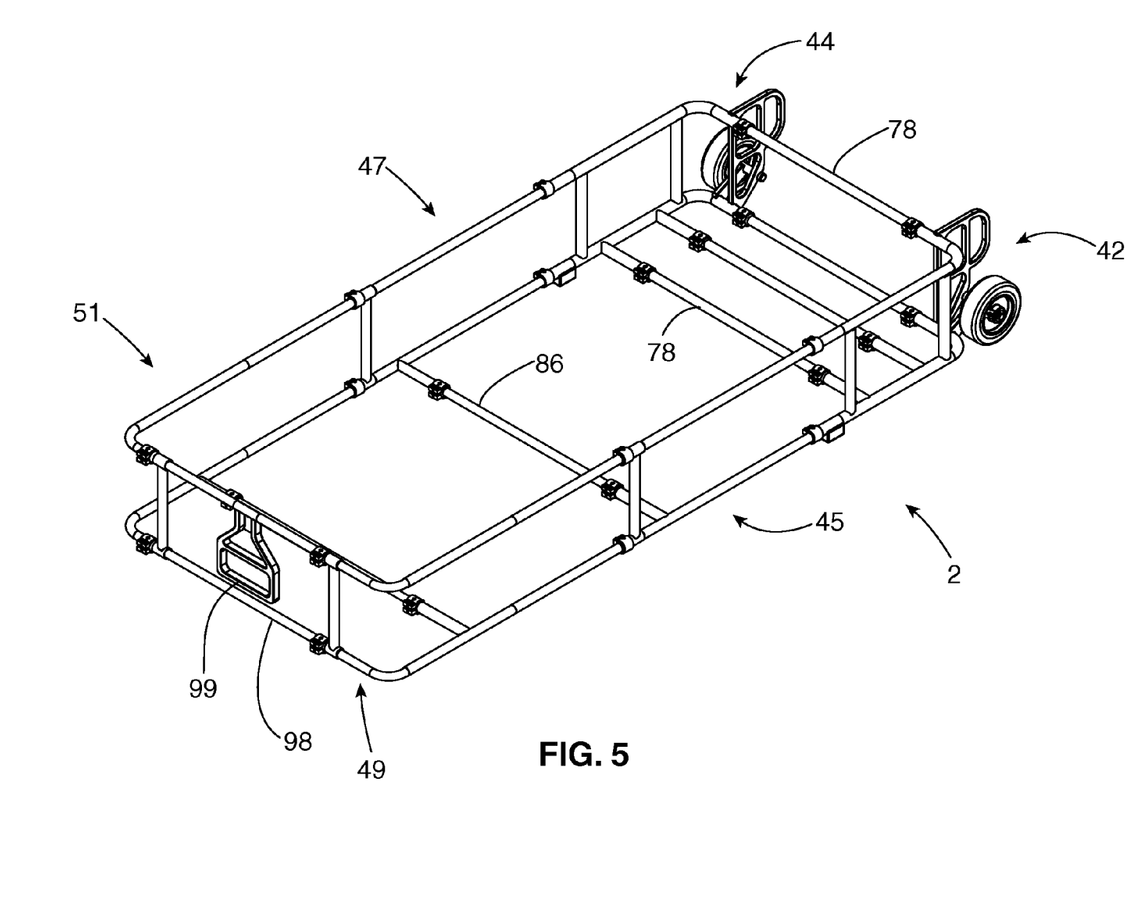
FIG. 5 is a perspective view of an expandable cooler cart in accordance with the present invention.
Figure 6:
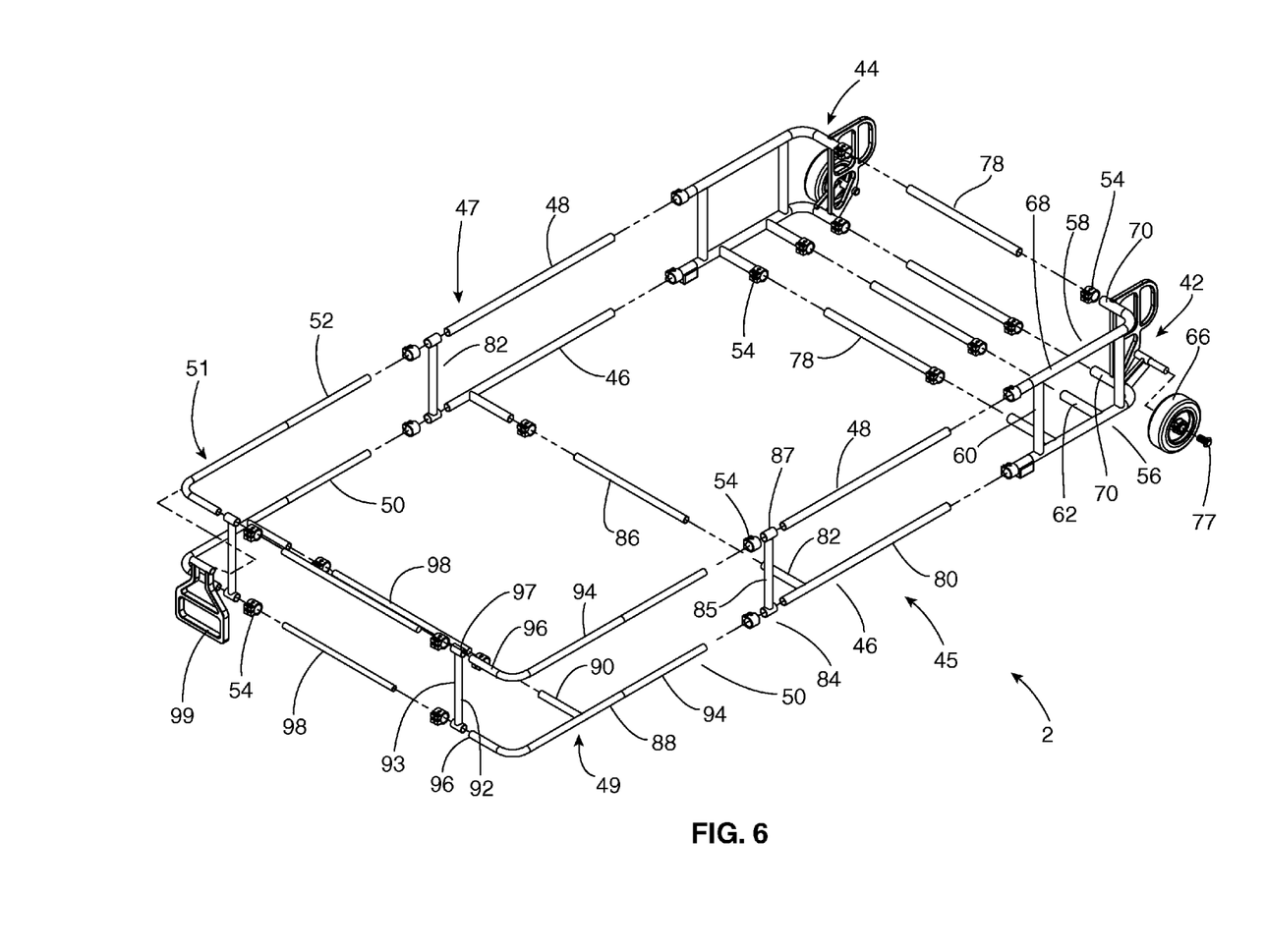
FIG. 6 is an exploded perspective view of an expandable cooler cart in accordance with the present invention.

With reference to FIGS. 5-6, an expandable cooler cart 2 preferably includes a left rear support 42, a right rear support 44, a left middle telescoping section 45, a right middle telescoping section 47, a left front section 49, a right front section 51, a plurality of widthwise telescoping tubes and a plurality of pipe clamps 54.

Figure 7:
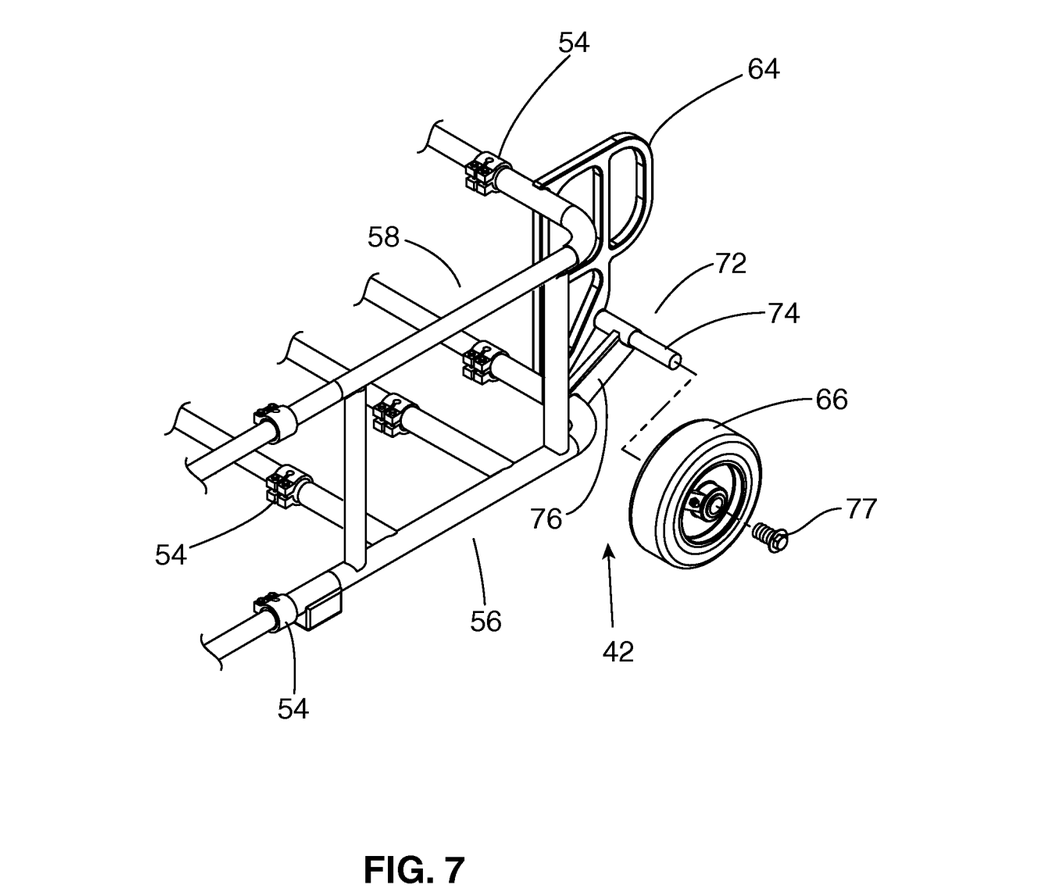
FIG. 7 is an enlarged perspective view of a left rear support of an expandable cooler cart in accordance with the present invention.

With reference to FIG. 7, the left rear support 42 includes a rear support tube 56, a rear telescoping tube 58, two rear vertical tubes 60, a plurality of rear support telescoping tubes 62, a rest support 64 and a wheel 66. The rear support tube 56 and the rear telescoping tube 58 include an L-shape having a rear lengthwise leg 68 and a rear widthwise leg 70. One end of the two rear vertical tubes 60 is attached to the lower support tube 56 and the other end of the two rear vertical tubes is attached to the rear telescoping tube 58. The plurality of rear support telescoping tubes 62 extend inward from the rear support tube 56.

The rest support 64 is attached to the rear widthwise leg 70 of the rear support tube 56 and the rear telescoping tube 58. An axle spindle 72 includes a spindle portion 74 and a support portion 76. The support portion 76 extends substantially perpendicular from the spindle portion 74. One end of the spindle portion 74 is attached to the rest support 64 and the other end is sized to pivotally receive the wheel 66. The wheel is preferably axially retained on the spindle portion 74 with a fastener 77. A distal end of the support portion 76 is attached to the rear widthwise leg 70 of the rear support tube 56. The right rear support 44 includes all the elements of the left rear support 42, but is a mirror image of the left rear support 42. Four rear widthwise telescoping tubes 78 are preferably slidably engaged with an inner perimeter of the plurality of rear support telescoping tubes 62 extending from the left and right rear supports 42, 44 and an inner perimeter of the rear widthwise legs 70 of the rear support tube 56 and the rear telescoping tube 58. The telescoping tube connections are secured in place with the plurality of pipe clamps 54.

Each middle telescoping section 45, 47 includes a middle support tube 46, a middle telescoping tube 48 and at least one middle vertical support member 84. Each middle support tube 46 includes a middle lengthwise member 80 and a middle support telescoping member 82 extending from an inside of the middle lengthwise member 80. The middle telescoping tube 48 is spaced apart from the middle support tube 46 with the at least one middle vertical support member 84. The middle vertical support member 84 includes a middle vertical portion 85 and two middle horizontal portions 87 attached perpendicular to each end of the middle vertical portion 85. An inner perimeter of the two middle horizontal portions 87 are sized to receive the middle support tube 46 and the middle telescoping tube 48. However, each end of the middle vertical portion 85 could also be attached to the middle support tube 46 and the middle lengthwise telescoping tube 48. One end of the middle support tube 46 and the middle lengthwise telescoping tube 48 is slidably retained in the rear lengthwise leg 68 of the rear support tube 56 and the rear telescoping tube 58, respectively. Each end of a middle widthwise telescoping tube 86 is slidably engaged with the middle support telescoping member 82 of left and right middle support tubes 46. All the telescoping connections are secured with the pipe clamp 54.

Each front section 49, 51 include a front support tube 50, a front telescoping tube 52 and at least one front vertical support member 92. Each front support tube 50 includes a front lengthwise member 88 and a front widthwise telescoping member 90 extending from an inside of the front lengthwise member 88. The front lengthwise telescoping tube 52 is spaced apart from the front support tube 50 with the at least one front vertical support member 92. The front vertical support member 92 includes a front vertical portion 93 and two front horizontal portions 95 attached perpendicular to each end of the front vertical portion 93. An inner perimeter of the two front horizontal portions 95 are sized to receive the front support tube 50 and the front lengthwise telescoping tube 52. However, each end of the front vertical portion 93 could also be attached to the front support tube 50 and the front lengthwise telescoping tube 52.

The front support tube 88 and the front lengthwise telescoping tube 52 include an L-shape having a front lengthwise leg 94 and a front widthwise leg 96. The front lengthwise legs 96 of the front support tube 50 and the front lengthwise telescoping tube 52 are slidably received by the middle support tube 46 and the middle telescoping tube 48, respectively. Three front widthwise telescoping tubes 98 are slidably received by the front widthwise telescoping member 90 and the front widthwise legs 96 of the front support tube 50 and the front lengthwise telescoping tube 52. All the telescoping connections are secured with the pipe clamp 54. A handle 99 is pivotally retained on one of the front widthwise telescoping tubes 98.

Figure 8:
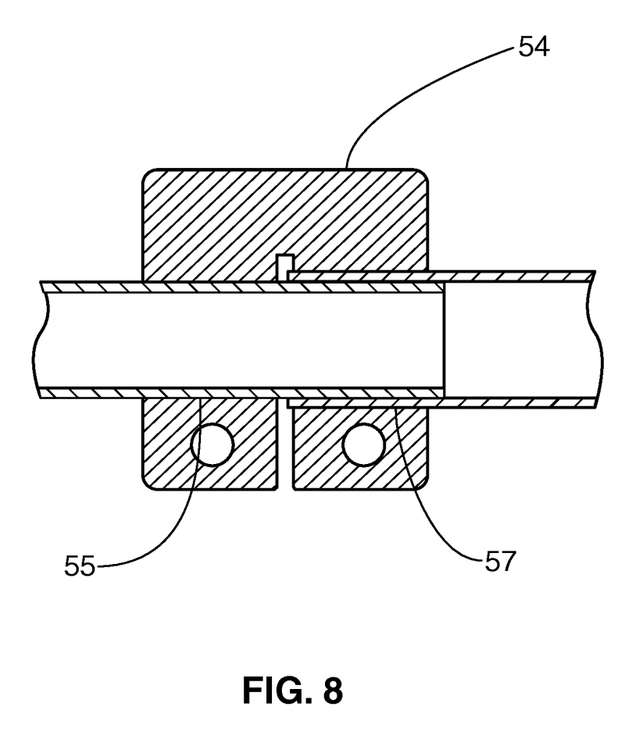
FIG. 8 is a cross sectional view of a pipe clamp secured to a telescoping connection of an expandable cooler cart in accordance with the present invention.
Figure 9:
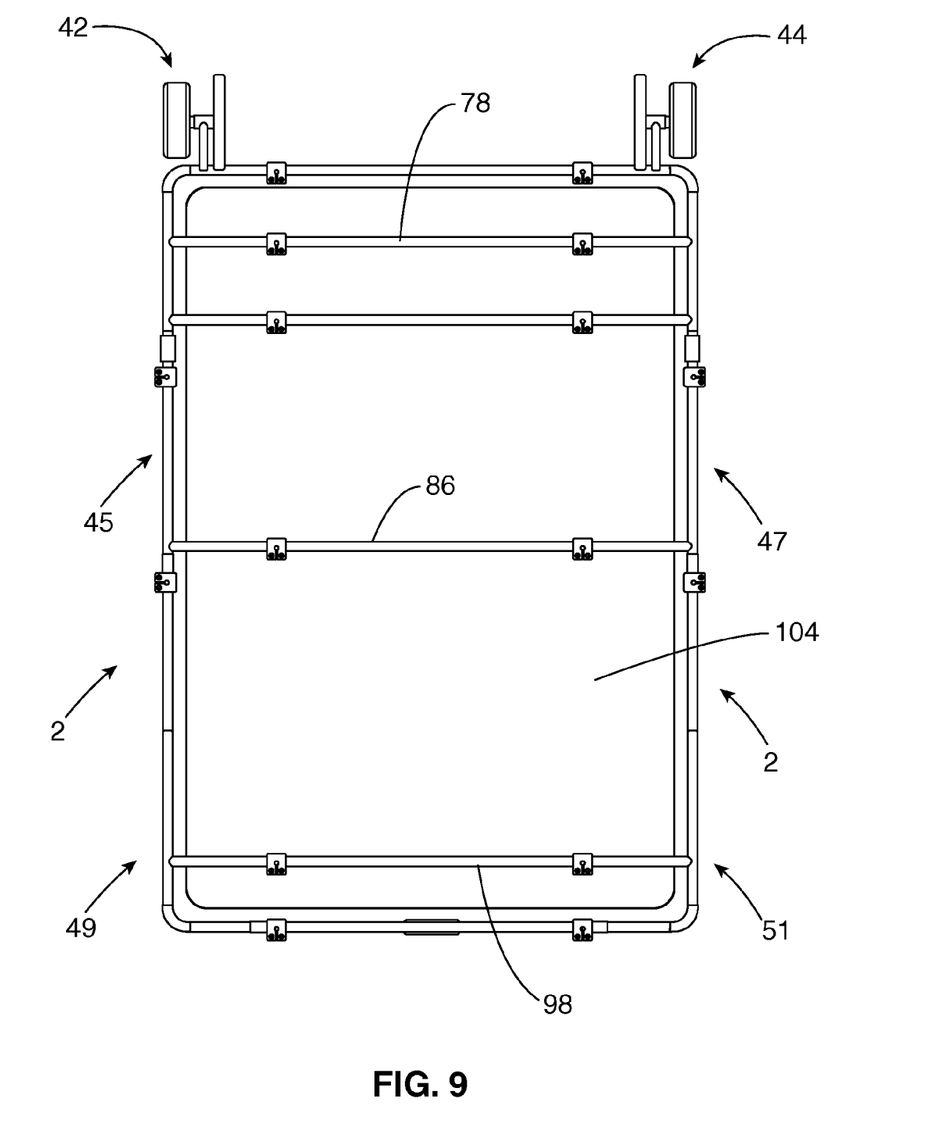
FIG. 9 is a bottom view of a large cooler retained in an expandable cooler cart in accordance with the present invention.
Figure 10:
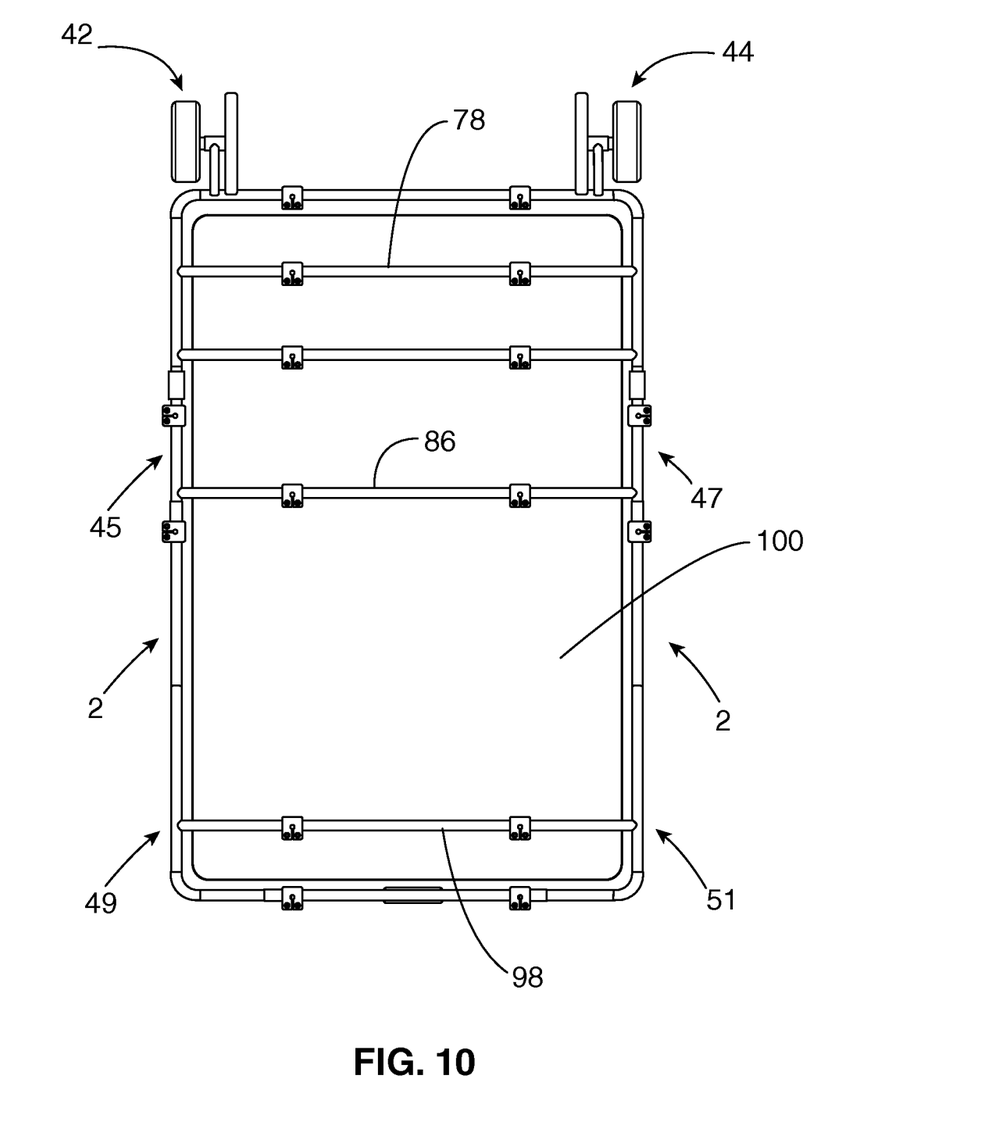
FIG. 10 is a bottom view of a smaller cooler retained in an expandable cooler cart in accordance with the present invention.

With reference to FIG. 8, the pipe clamp 54 includes a first clamp diameter 55 and a second clamp diameter 57 for clamping a telescoping connection. With reference to FIGS. 9-10, the plurality of pipe clamps 54 are loosened and the plurality of telescoping tubes are slid to accommodate the outer perimeter of the high-end cooler 100 and a larger high-end cooler 104. The plurality of pipe clamps 54 are then tightened. The expandable cooler cart 2 may be stood-up on end to allow the high-end cooler to be drained. The expandable cooler cart 2 may include any of the features of the cooler cart 1.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. An expandable cooler cart comprising:
   a left rear support;
   a right rear support;
   a plurality of widthwise telescoping tubes, some of said plurality of widthwise telescoping tubes having one end slidably engaged with said left rear support, an opposing end slidably engaged with said right rear support;
   a left front section;
   a right front section;
   some of said plurality of widthwise telescoping tubes having one end slidably engaged with said left front section, an opposing is end slidably engaged with said right front section;
   a left middle telescoping section having one end slidably engaged with said left front section, an opposing end slidably engaged with said left rear support;
   a right middle telescoping section having one end slidably engaged with said right front section, an opposing end slidably engaged with said right rear support;
   at least one of said plurality of widthwise telescoping tubes having one end slidably engaged with said left middle telescoping section, an opposing end slidably engaged with said right middle telescoping section, wherein an inner perimeter of said left and right rear supports, said left and right middle telescoping sections, and said left and right front sections being adjustable to retain different size coolers.

2. The expandable cooler cart of claim 1, further comprising:
   a left wheel pivotally engaged with said left rear support, a right wheel pivotally engaged with said right rear support.

3. The expandable cooler cart of claim 2, further comprising:
   a left rest support is attached to an end of said left rear support, said left wheel is pivotally retained on said left rest support, a right rest support is attached to an end of said right rear support, said right wheel is pivotally retained on said right rest support.

4. The expandable cooler cart of claim 1, further comprising:
   a handle is pivotally engaged with one of said plurality of front widthwise telescoping tubes.

5. The expandable cooler cart of claim1, further comprising:
   a plurality of pipe clamps each one having a first clamp diameter and a second clamp diameter.

6. The expandable cooler cart of claim 1 wherein:
   said middle telescoping section includes a middle support tube, a middle telescoping tube and at least one middle vertical support member, one end of said at least one middle vertical support member is attached to said middle support tube, an opposing end of said at least one middle vertical support member is attached to said middle telescoping tube.

7. The expandable cooler cart of claim 1 wherein:
   said front section includes a middle support tube, a middle lengthwise telescoping tube and at least one front vertical support member, one end of said at least one front vertical support member is attached to said front support tube, an opposing end of said front vertical support member is attached to said front telescoping tube.

8. The expandable cooler cart of claim 1 wherein:
said rear section includes a rear support tube, a rear telescoping tube and at least two rear vertical tubes, one end of said two rear vertical tubes are attached to said rear support tube, an opposing end of said two rear vertical tubes are attached to said rear telescoping tube.

9. An expandable cooler cart comprising:
a left rear support;
a right rear support;
a plurality of rear widthwise telescoping tubes having one end slidably engaged with said left rear support, an opposing end slidably engaged with said right rear support;
a left front section;
a right front section;
a plurality of front widthwise telescoping tubes having one end slidably engaged with said left front section, an opposing end slidably engaged with said right front section;
a left middle telescoping section having one end slidably engaged with said left front section, an opposing end slidably engaged with said left rear support;
a right middle telescoping section having one end slidably engaged with said right front section, an opposing end slidably engaged with said right rear support;
at least one middle widthwise telescoping tube having one end slidably engaged with said left middle telescoping section, an opposing end slidably engaged with said right middle telescoping section, wherein an inner perimeter of said left and right rear supports, said left and right middle telescoping sections, and said left and right front sections being adjustable to retain different size coolers, some of said plurality of telescoping tubes support a bottom of the different size coolers.

10. The expandable cooler cart of claim 9, further comprising:
a left wheel pivotally engaged with said left rear support, a right wheel pivotally engaged with said right rear support.

11. The expandable cooler cart of claim 10, further comprising:
a left rest support is attached to an end of said left rear support, said left wheel is pivotally retained on said left rest support, a right rest support is attached to an end of said right rear support, said right wheel is pivotally retained on said right rest support.

12. An expandable cooler cart of claim 9, further comprising:
a handle is pivotally engaged with one of said plurality of front widthwise telescoping tubes.

13. The expandable cooler cart of claim 9, further comprising:
a plurality of pipe clamps each one having a first clamp diameter and a second clamp diameter.

14. The expandable cooler cart of claim 9 wherein:
said middle telescoping section includes a middle support tube, a middle telescoping tube and at least one middle vertical support member, one end of said at least one middle vertical support member is attached to said middle support tube, an opposing end of said at least one middle vertical support member is attached to said middle telescoping tube.

15. The expandable cooler cart of claim 9 wherein:
said front section includes a middle support tube, a middle lengthwise telescoping tube and at least one front vertical support member, one end of said at least one front vertical support member is attached to said front support tube, an opposing end of said front vertical support member is attached to said front telescoping tube.

16. An expandable cooler cart comprising:
a left rear support includes a left wheel pivotally engaged with said left rear support;
a right rear support includes a right wheel pivotally engaged with said right rear support;
a plurality of rear widthwise telescoping tubes having one end slidably engaged with said left rear support, an opposing end slidably engaged with said right rear support;
a left front section;
a right front section;
a plurality of front widthwise telescoping tubes having one end slidably engaged with said left front section, an opposing end slidably engaged with said right front section;
a left middle telescoping section having one end slidably engaged with said left front section, an opposing end slidably engaged with said left rear support;
a right middle telescoping section having one end slidably engaged with said right front section, an opposing end slidably engaged with said right rear support;
at least one middle widthwise telescoping tube having one end slidably engaged with said left middle telescoping section, an opposing end slidably engaged with said right middle telescoping section, wherein an inner perimeter of said left and right rear supports, said left and right middle telescoping sections, and said left and right front sections being adjustable to retain different size coolers, some of said plurality of telescoping tubes support a bottom and ends of the different size coolers; and
a plurality of securement devices for securing an axial orientation of a plurality of telescoping connections.

17. The expandable cooler cart of claim 16, further comprising:
a left rest support is attached to an end of said left rear support, said left wheel is pivotally retained on said left rest support, a right rest support is attached to an end of said right rear support, said right wheel is pivotally retained on said right rest support.

18. The expandable cooler cart of claim 16, further comprising:
a handle is pivotally engaged with one of said plurality of front widthwise telescoping tubes.

19. The expandable cooler cart of claim 16, further comprising:
a plurality of pipe clamps each one having a first clamp diameter and a second clamp diameter.

20. The expandable cooler cart of claim 16 wherein:
said middle telescoping section includes a middle support tube, a middle telescoping tube and at least one middle vertical support member, one end of said at least one middle vertical support member is attached to said middle support tube, an opposing end of said at least one middle vertical support member is attached to said middle telescoping tube.

* * * * *